United States Patent
Sarkar et al.

(10) Patent No.: US 10,035,911 B2
(45) Date of Patent: Jul. 31, 2018

(54) CURABLE, DUAL CURE, ONE PART SILICONE COMPOSITION

(71) Applicant: Momentive Performance Materials Inc., Waterford, NY (US)

(72) Inventors: Soumya Sarkar, Bangalore (IN); Amol Murlidharrao Kendhale, Bangalore (IN); Tanigawa Eiji, Ohta (JP)

(73) Assignee: Momentive Performance Materials Inc., Waterford, NY (US)

( * ) Notice: Subject to any disclaimer, the term of this patent is extended or adjusted under 35 U.S.C. 154(b) by 135 days.

(21) Appl. No.: 15/158,662

(22) Filed: May 19, 2016

(65) Prior Publication Data

US 2017/0335109 A1  Nov. 23, 2017

(51) Int. Cl.
| | |
|---|---|
| C08L 83/06 | (2006.01) |
| C08J 5/18 | (2006.01) |
| C09J 183/06 | (2006.01) |
| C08J 3/28 | (2006.01) |

(52) U.S. Cl.
CPC ............. *C08L 83/06* (2013.01); *C08J 3/28* (2013.01); *C08J 5/18* (2013.01); *C09J 183/06* (2013.01); *C08J 2383/06* (2013.01); *C08J 2483/06* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 4,528,081 A | * | 7/1985 | Lien | C08G 77/20 522/39 |
| 4,675,346 A | * | 6/1987 | Lin | C08F 2/50 522/14 |
| 4,699,802 A | | 10/1987 | Nakos et al. | |
| 5,292,849 A | * | 3/1994 | Fujioka | C08G 77/20 526/279 |

(Continued)

FOREIGN PATENT DOCUMENTS

| | | |
|---|---|---|
| CA | 1234445 A1 | 11/1999 |
| EP | 0182941 B1 | 4/1990 |
| WO | 20160141546 A1 | 9/2016 |

OTHER PUBLICATIONS

Patent Cooperation Treaty (PCT), International Search Report and Written Opinion for Application PCT/US2017/033233 filed May 18, 2017, dated Jul. 31, 2017, International Searching Authority, EP.

*Primary Examiner* — Robert S Loewe
(74) *Attorney, Agent, or Firm* — Joseph Waters; McDonald Hopkins LLC

(57) ABSTRACT

Provided is a one part, dual curable composition comprising (A) a first acrylic functional polyorganosiloxane with at least one moisture curable functional group, (B) a second acrylic functional polyorganosiloxane, which may optionally contain a moisture curable functional group, and (C) a third functional polyorganosiloxane, which optionally contains an acrylic and moisture curable functional group. The combination of (A), (B), and (C) provides a composition that is both moisture curable and radiation curable and provides a material that is fast curing via the dual cure functionality and provides a cured material exhibiting a relatively low modulus, good adhesion, and optical clarity.

19 Claims, 1 Drawing Sheet

(56) References Cited

U.S. PATENT DOCUMENTS

| | | | | |
|---|---|---|---|---|
| 5,300,608 | A | * 4/1994 | Chu | C08G 77/08 |
| | | | | 528/14 |
| 6,140,444 | A | * 10/2000 | Levandoski | C08G 77/08 |
| | | | | 502/158 |
| 6,451,870 | B1 | 9/2002 | Decato et al. | |
| 6,627,672 | B1 | * 9/2003 | Lin | C08J 3/243 |
| | | | | 522/148 |
| 6,827,985 | B2 | * 12/2004 | Levandoski | C08L 83/04 |
| | | | | 427/387 |
| 6,828,355 | B1 | * 12/2004 | Chu | C09J 183/04 |
| | | | | 522/148 |
| 8,013,314 | B2 | * 9/2011 | Levandoski | C08L 83/04 |
| | | | | 250/484.4 |
| 8,304,489 | B2 | * 11/2012 | Takei | C08F 299/08 |
| | | | | 524/588 |
| 8,524,850 | B2 | 9/2013 | Ueyama et al. | |
| 8,871,317 | B2 | * 10/2014 | Cai | C09J 133/02 |
| | | | | 428/34.1 |
| 2005/0267276 | A1 | 12/2005 | Chu | |
| 2009/0166559 | A1 | 7/2009 | Levandoski et al. | |
| 2015/0315405 | A1 | 11/2015 | Li et al. | |

\* cited by examiner

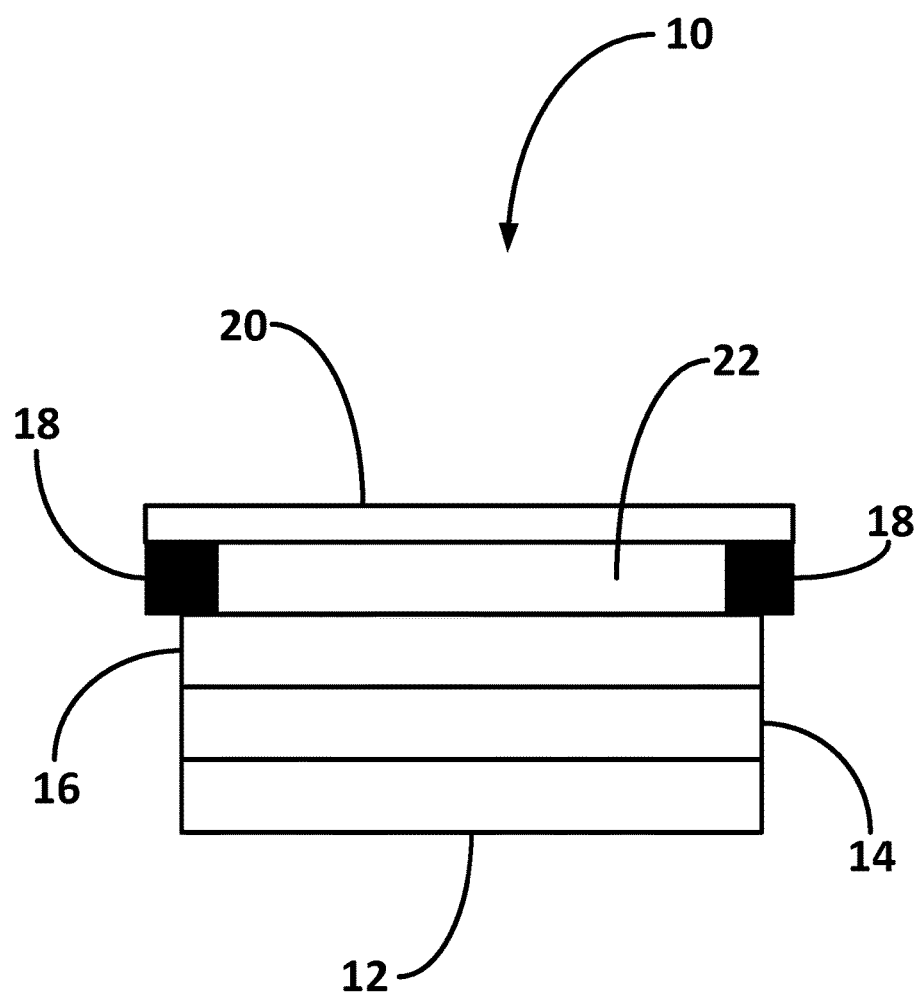

CURABLE, DUAL CURE, ONE PART SILICONE COMPOSITION

FIELD

Provided is a dual curable, one-part silicone composition. In particular, provided is a curable composition that is moisture curable and radiation curable. The composition comprises a combination of acrylic functional silicone polymers that impart the dual cure characteristics. The compositions exhibit both relatively fast curing and provide a cured material having one or more desirable properties such as, for example, optical clarity, relatively low modulus, etc.

BACKGROUND

Flat panel type image display devices such as a liquid crystal, plasma, organic EL, etc., are of special interest in the marketplace. The flat panel type image display device has a display area (an image display portion) in which a number of picture elements comprising a semiconductor layer or a fluorescent layer constituting an active element, or a light-emitting layer are provided in a matrix state between a pair of the substrates at least one of which has optical transparency such as a glass. The devices are generally formed by encapsulating the surroundings of the display area (an image display portion) and a protective portion formed by a glass or an optical plastic such as an acrylic resin by an adhesive.

Current flat panel displays employ liquid optically clear adhesives in between various functional layers to effectively fill the air-gap for proper light management and mechanical integrity of the overall device. Silicone adhesives offer an advantage over the traditional epoxy or organic acrylic systems mainly with respect to their mechanical stability over a wide range of temperature, low shrinkage properties, and ability to offer low mura characteristics. Typical industrial demands for these optically clear adhesives include fast dual cure characteristics such as UV and/or moisture cure to address curing both in transparent regions and in regions under the black matrix of the device while offering low modulus, high reliability, and no delamination.

The major challenges in the development of silicone formulations involve the attainment of proper dissolution of several additives in one-part formulations to achieve optical clarity, fast cure speed, low modulus, and a high reliability material.

SUMMARY

The present technology and invention provide a curable silicone composition that is both UV and moisture curable. Upon curing, the cured material formed from the composition exhibits several desirable properties including, but not limited to, one or more of good adhesion/adhesiveness, optical properties such as transparency, stability, etc., and relatively low modulus.

In one aspect, the present invention provides a radiation curable and moisture curable composition comprising:

(A) a first acrylic functional polyorganosiloxane with at least one moisture curable functional group;
(B) a second acrylic functional polyorganosiloxane, which may optionally contain a moisture curable functional group; and
(C) a third functional polyorganosiloxane, which optionally contains an acrylic and moisture curable functional group.

In one embodiment of the composition:
the first acrylic functional polyorganosiloxane (A) is of the formula:

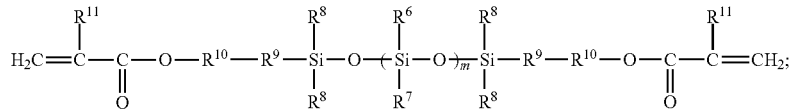

the second acrylic functional polyorganosiloxane (B) is of the formula:

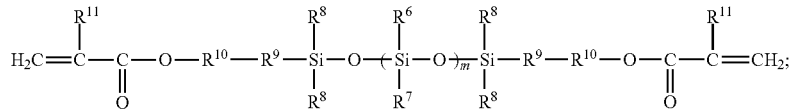

and
the third functional polyorganosiloxane (C) is of the formula:

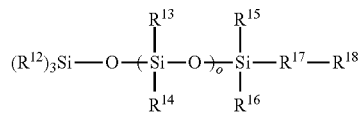

where $R^1$, $R^2$, $R^3$, $R^6$, $R^7$, $R^8$, $R^{13}$, $R^{14}$ are independently chosen from a C1-C10 alkyl; an unsaturated C1-C10 alkyl; a C1-C10 alkyl comprising one or more halogen groups; a C6-C30 aryl; and a C6-C30 substituted aryl;

$R^4$ and $R^9$ are independently chosen from a C1-C10 alkylene with or without substitution or interruption by one or more heteroatoms;

$R^{10}$ is independently chosen from null (i.e., a bond); a C1-C10 alkyl; or a C6-C30 cycloalkyl group, the C1-C10 alkyl or C6-C30 alkyl group optionally comprising a —$OR^{19}$ substituent where $R^{19}$ is hydrogen or a C1-C6 alkyl;

$R^5$ and $R^{11}$ are independently chosen from hydrogen or a C1-C6 alkyl;

$R^{12}$ is chosen from a C1-C10 alkyl; a C1-C10 alkyl comprising one or more halogen groups; a C6-C30 aryl; or a C6-C30 substituted aryl;

$R^{15}$ and $R^{16}$ are independently chosen from a C1-C3 alkyl, a alkoxyalkyl, and a siloxyalkyl;

$R^{17}$ is independently chosen from null (i.e., a bond), a C1-C10 alkyl; and a C6-C30 cycloalkyl group where the C1-C10 alkyl or C6-C30 cycloalkyl group may comprise a hydroxy group, an alkoxy group, and may have one or more heteroatoms;

$R^{18}$ is chosen from a C2-C10 unsaturated alkyl, or a (meth)acryl group, with the proviso that when $R^{18}$ is an alkyl group, $R^{15}$, $R^{16}$, or both $R^{15}$ and $R^{16}$ are chosen from an alkoxyalkyl and a siloxyalkyl; and n, m, o are independent of each other and are zero or positive numbers.

In one embodiment, the composition according to any previous embodiment comprises the third acrylic functional polyorganosiloxane (C) in an amount of at least 0.01 wt. % based on the total weight of the composition.

In one embodiment, the composition according to any previous embodiment comprises the third functional polyorganosiloxane (C) in an amount of from about 0.01 wt. % to about 50 wt. % based on the total weight of the composition.

In one embodiment, the composition according to any previous embodiment is such that the ratio of the first acrylic polyorganosiloxane (A) to the second acrylic functional polyorganosiloxane (B) is from about 99.95:0.05 to about 0.05:99.95. In one embodiment, the composition according to any previous embodiment is such that the ratio of the first acrylic polyorganosiloxane (A) to the second acrylic functional polyorganosiloxane (B) is from 99.9:0.1 to about 0.1:99.9; from 99.8:0.2 to 0.2:99.8; from 95:5 to 5:95; from 90:10 to 10:90; from 80:20 to 20:80; from 30:70 to 70:30; even from 60:40 to about 40:60 based on the total weight of (A) and (B) in the composition.

In one embodiment, the composition according to any previous embodiment is such that the first acrylic functional polyorganosiloxane (A) has a viscosity of from about 500 cps to about 15,000 cps; the second acrylic functional polyorganosiloxane (B) has a viscosity of from about 500 cps to about 15,000 cps; and the third functional polyorganosiloxane has a viscosity of from about 3 cps to about 1,000 cps. In one embodiment, the composition according to any previous embodiment is such that polymer (A) has a viscosity of from about 500 cps to about 15,000 cps; from about 1,000 cps to about 12,500 cps; from about 2,500 cps to about 10,000 cps; even from about 5,000 cps to about 7,500 cps; polymer (B) has a viscosity of from about 500 cps to about 15,000 cps; from about 1,000 cps to about 12,500 cps; from about 2,500 cps to about 10,000 cps; even from about 5,000 cps to about 7,500 cps; and polymer (C) has a viscosity of from about 3 cps to about 1,000 cps; from about 50 cps to about 750 cps; from about 100 cps to about 600 cps; even from about 250 cps to about 500 cps.

In one embodiment, the composition according to any previous embodiment comprises two or more first acrylic functional polyorganosiloxanes (A). In one embodiment, the two or more first acrylic functional polyorganosiloxanes (A) each have a different viscosity. In one embodiment, the composition comprises a first polymer (A) having a viscosity of from about 500 to about 3,500 cps, and a second polymer (A) having a viscosity of from about 5,000 to about 15,000 cps. In one embodiment, the composition comprises a first polymer (A) having a viscosity of from about 750 to about 2,500 cps, and a second polymer (A) having a viscosity of from about 7,000 to about 12,000 cps. In one embodiment, the composition comprises a first polymer (A) having a viscosity of from about 1,000 to about 2,000 cps, and a second polymer (A) having a viscosity of from about 8,000 to about 10,000 cps.

In one embodiment, the composition according to any previous embodiment comprises a photoinitiator component and a moisture cure catalyst.

In one embodiment, the photoinitiator is chosen from a benzophenone, a phosphine oxide, a nitroso compound, an acryl halide, a hydrazone, a hydroxy ketone, an amino ketone, a mercapto compound, a pyrillium compound, a triacrylimidazole, a benzimidazole, a chloroalkyl triazine, a benzoin ether, a benzil ketal, a benzil ester, a thioxanthone, a camphorquinone, an acetophenone derivative, or a combination of two or more thereof.

In one embodiment, the photoinitiator comprises a mixture of a hydroxyketone and a phosphine oxide.

In one embodiment, the composition according to any previous embodiment comprises an adhesion promoter.

In one embodiment, the adhesion promoter is chosen from an (aminoalkyl)trialkoxysilane, an (aminoalkyl)alkyldialkoxysilane, a bis(trialkoxysilylalkyl)amine, a tris(trialkoxysilylalkyl)amine, a tris(trialkoxysilylalkyl)cyanurate, a tris(trialkoxysilylalkyl)isocyanurate, an (epoxyalkyl)trialkoxysilane, an (epoxyalkylether)trialkoxysilane, or a combination of two or more thereof.

In one embodiment, the composition according to any previous embodiment comprises an acryloxy resin.

In another aspect, the present invention provides a cured film formed from the composition of any of the previous embodiments.

In still another aspect, the present invention provides an article comprising the cured film.

In one embodiment, the cured film is a sealing agent.

In yet another aspect, the present invention provides an image display device comprising an image display portion and a protective portion encapsulated by the sealing agent.

In still yet another aspect, the present invention provides a method of forming a cured film comprising curing the composition of any of the previous embodiments by (a) UV radiation, and/or (b) condensation curing.

BRIEF DESCRIPTION OF THE DRAWINGS

FIG. 1 is a schematic of a display device in accordance with embodiments of the invention

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

The one part, dual curable composition comprises (A) a first acrylic functional polyorganosiloxane with at least one moisture curable functional group, (B) a second acrylic functional polyorganosiloxane, which may optionally contain a moisture curable functional group, and (C) a third functional polyorganosiloxane, which optionally contains an acrylic and moisture curable functional group. The combination of (A), (B), and (C) provides a composition that is both moisture curable and radiation curable and provides a material that is fast curing via the dual cure functionality and provides a cured material exhibiting a relatively low modulus. The cured material may also exhibit other desirable properties such as, for example, optical clarity, good adhesion, etc.

In one embodiment, the curable composition comprises:
(A) a first acrylic polyorganosiloxane of the formula:

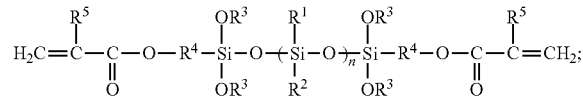

(B) a second acrylic polyorganosiloxane of the formula:

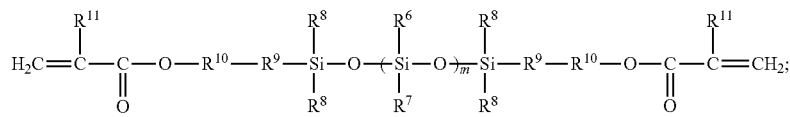

and
(C) a third functional polyorganosiloxane with optional acrylic and moisture curable functionality of the formula:

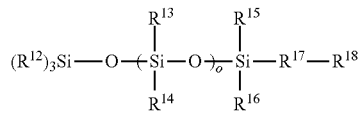

where $R^1$, $R^2$, $R^3$, $R^6$, $R^7$, $R^8$, $R^{13}$, $R^{14}$ are independently chosen from a C1-C10 alkyl; an unsaturated C1-C10 alkyl; a C1-C10 alkyl comprising one or more halogen groups; a C6-C30 aryl; and a C6-C30 substituted aryl;

$R^4$ and $R^9$ are independently chosen from a C1-C10 alkylene with or without substitution or interruption by one or more heteroatoms;

$R^{10}$ is independently chosen from null (i.e., a bond); a C1-C10 alkyl; or a C6-C30 cycloalkyl group, the C1-C10 alkyl or C6-C30 alkyl group optionally comprising a —$OR^{19}$ substituent where $R^{19}$ is hydrogen or a C1-C6 alkyl;

$R^5$ and $R^{11}$ are independently chosen from hydrogen or a C1-C6 alkyl;

$R^{12}$ is chosen from a C1-C10 alkyl; a C1-C10 alkyl comprising one or more halogen groups; a C6-C30 aryl; or a C6-C30 substituted aryl;

$R^{15}$ and $R^{16}$ are independently chosen from a C1-C3 alkyl, a alkoxyalkyl, and a siloxyalkyl;

$R^{17}$ is independently chosen from null (i.e., a bond), a C1-C10 alkyl; and a C6-C30 cycloalkyl group where the C1-C10 alkyl or C6-C30 cycloalkyl group may comprise a hydroxy group, an alkoxy group, and may have one or more heteroatoms;

$R^{18}$ is chosen from a C2-C10 unsaturated alkyl, or a (meth)acryl group, with the proviso that when $R^{18}$ is an alkyl group, $R^{15}$, $R^{16}$, or both $R^{15}$ and $R^{16}$ are chosen from an alkoxyalkyl and a siloxyalkyl; and n, m, o are independent of each other and are zero or positive numbers.

An "alkoxyalkyl" group is an alkyl radical substituted with one or more an alkoxy groups. The alkoxy group may be of the formula —$OR^{20}$, where $R^{20}$ is chosen from a C1-C10 alkyl group, or a C6-C30 cycloalkyl. In embodiments, the alkyl group is a C1-C10 alkyl group, a C1-C6 alkyl group, even a C1-C4 alkyl group. A "siloxyalkyl" group is an alkyl radical substituted with one or more siloxy groups. The siloxy group may be of the formula —O—Si$(R^{21})_3$, where $R^{21}$ is chosen from a C1-C10 alkyl group, a C6-C30 cycloalkyl group, or a C6-C30 aryl group.

In embodiments, $R^1$, $R^2$, $R^3$, $R^6$, $R^7$, $R^8$, $R^{13}$, $R^{14}$ are chosen from a C1-C4 alkyl and $R^5$ and $R^{11}$ are independently hydrogen. In other embodiments, $R^1$, $R^2$, $R^3$, $R^6$, $R^7$, $R^8$, $R^{13}$, $R^{14}$ are chosen from a C1-C4 alkyl and $R^5$ and $R^{11}$ are independently chosen from a C1-C4 alkyl. In one embodiment, $R^1$, $R^2$, $R^3$, $R^6$, $R^7$, $R^8$, $R^{13}$, $R^{14}$ are each methyl and $R^5$ and $R^{11}$ are each hydrogen. In other embodiments, $R^1$, $R^2$, $R^3$, $R^6$, $R^7$, $R^8$, $R^{13}$, $R^{14}$ are chosen from a C1-C4 alkyl and $R^5$ and $R^{11}$ are each methyl.

In polymers (A), (B), and (C), the values of n, m, and o are such that the respective polymers have a desired viscosity. In embodiments, n, m, and o are such that the polymers independently have a viscosity of from about 3 cps to about 2,500,000 cps at 25° C.; from about 50 to about 2,000,000 cps; from about 100 to about 1,500,000 cps; from about 500 to about 1,000,000 cps; even from about 1,000 to about 500,000 cps. In still other embodiments, polymers (A), (B), and (C) have a viscosity of from about 3 cps to about 20,000 cps; from about 10 to about 10,000 cps; from about 50 to about 7,500 cps; even from about 1,000 to about 5,000 cps. Here as elsewhere in the specification and claims, numerical values may be combined to form new and non-disclosed ranges.

In still other embodiments, polymer (A) has a viscosity of from about 500 cps to about 15,000 cps; from about 1,000 cps to about 12,500 cps; from about 2,500 cps to about 10,000 cps; even from about 5,000 cps to about 7,500 cps; polymer (B) has a viscosity of from about 500 cps to about 15,000 cps; from about 1,000 cps to about 12,500 cps; from about 2,500 cps to about 10,000 cps; even from about 5,000 cps to about 7,500 cps; and polymer (C) has a viscosity of from about 3 cps to about 1,000 cps; from about 50 cps to about 750 cps; from about 100 cps to about 600 cps; even from about 250 cps to about 500 cps. Here as elsewhere in the specification and claims, numerical values may be combined to form new and non-disclosed ranges.

It will be appreciated that mixtures of the respective polymers (A), (B), and (C) may be employed in the composition. For example, the composition may include two or more (A) polymers, two or more (B) polymers, and/or two or more (C) polymers, where the polymers of a particular type differ from one another in terms of structure (e.g., different R groups) or in terms of viscosity. In embodiments, for example, the composition comprises a first polymer (A) having a first viscosity, and a second polymer (A) having a second viscosity that is different from the first viscosity. In one embodiment, the composition comprises a first polymer (A) having a viscosity of from about 500 to about 3,500 cps, and a second polymer (A) having a viscosity of from about 5,000 to about 15,000 cps. In one embodiment, the composition comprises a first polymer (A) having a viscosity of from about 750 to about 2,500 cps, and a second polymer (A) having a viscosity of from about 7,000 to about 12,000 cps. In one embodiment, the composition comprises a first polymer (A) having a viscosity of from about 1,000 to about 2,000 cps, and a second polymer (A) having a viscosity of from about 8,000 to about 10,000 cps.

Viscosity may be measured by any suitable method including using a rheometer or viscometer. For example, viscosity may be evaluated using a Rheometer (e.g., Haake 600) at a sheer rate of 10 $s^{-1}$ at 25° C. Viscosity may also be measured using a viscometer (e.g., a Brookfield DV-I Prime viscometer).

In the composition, polymer (A) and polymer (B) are provided in a ratio of from 99.95:0.05 to 0.05:99.95; from 99.9:0.1 to about 0.1:99.9; from 99.8:0.2 to 0.2:99.8; from 95:5 to 5:95; from 90:10 to 10:90; from 80:20 to 20:80; from 30:70 to 70:30; even from 60:40 to about 40:60 based on the total weight of (A) and (B) in the composition. Here as elsewhere in the specification and claims, numerical values may be combined to form new and non-disclosed ranges.

Polymer (C) is present in an amount of at least 0.01 wt. % based on the weight of the composition. In embodiments, polymer (C) is present in an amount of from about 0.01 to about 75 wt. %; from about 0.1 to about 50 wt. %; from about 1 to about 40 wt. %; from about 10 to about 25 wt. %. Here as elsewhere in the specification and claims, numerical values may be combined to form new and non-disclosed ranges.

The polymers (A), (B), and (C) may be prepared by any suitable method now known or later discovered for preparing such compounds. For example, (alkyl)acryloxyalkyl-dialkoxy terminated polydialkylsiloxanes may be prepared via condensation reactions as described in U.S. Pat. No. 4,863,992 using an appropriate (alkyl)acryloxyalkyl trialkoxy silane, a and a silanol. (Alkyl)acryloxyalkyl-bis-terminated polydialkylsiloxanes may be prepared by acid catalyzed ring opening reaction using appropriate starting materials as described in, for example, U.S. Pat. No. 8,524,850.

The composition further comprises a photoinitiator. The photoinitiator is not particularly limited and can be chosen as desired for a particular purpose or intended application. Examples of suitable photoinitiators include, but are not limited to, benzophenones, phosphine oxides, nitroso compounds, acryl halides, hydrazones, hydroxy ketones, amino ketones, mercapto compounds, pyrillium compounds, triacrylimidazoles, benzimidazoles, chloroalkyl triazines, benzoin ethers, benzil ketals, benzil esters, thioxanthones, camphorquinone, acetophenone derivatives, etc.

In one embodiment, the photoinitiator is chosen from an acylphosphine. The acyl phosphine can be a mono- or bis-acylphoshine. Examples of suitable acylphosphine oxides include those described in U.S. Pat. No. 6,803,392, which is incorporated herein by reference.

Specific examples of suitable acylphosphine photoinitiators include, but are not limited to, diphenyl(2,4,6-trimethylbenzoyl)phosphine oxide (DAROCUR® TPO), diphenyl (2,4,6-trimethylbenzoyl)phosphine oxide (ESACURE® TPO, LAMBERTI Chemical Specialties, Gallarate, Italy), diphenyl(2,4,6-trimethylbenzoyl)phosphine oxide (FIRSTCURE® HMPP available from Albemarle Corporation, Baton Rouge, La.), diphenyl(2,4,6-trimethylbenzoyi)phosphine oxide (LUCIRIN® TPO, available from BASF (Ludwigshafen, Germany), diphenyl(2,4,6-trimethylbenzoyl) phosphinate (LUCIRIN® TPO-L), phenyl bis(2,4,6-trimethyl benzoyl)phosphine oxide (IRGACURE® 819, available from Ciba Specialty Chemicals, Tarrytown, N.Y.), and bis(2,6-di-methoxybenzoyl)-2,4,4-trimethylpentylphosphine oxide (as IRGACURE® 1700, IRGACURE® 1800 and IRGACURE® 1850 in admixture with a-hydroxyketones from Ciba Spezialitatenchemie).

Examples of α-hydroxyketone photoinitiators can include 1-hydroxy-cyclohexylphenyl ketone (IRGACURE® 184), 2-hydroxy-2-methyl-1-phenyl-1-propanone (DAROCUR® 1173), and 2-hydroxy-1-[4-(2-hydroxyethoxy)phenyl]-2-methyl-1-propanone (IRGACURE® 2959), all available from Ciba Specialty Chemicals (Tarrytown, N.Y.).

Examples of α-aminoketones photoinitiators can include 2-benzyl-2-(dimethylamino)-1-[4-(4-morpholinyl)phenyl]-1-butanone (IRGACURE® 369), and 2-methyl-1-[4-(methylthio)phenyl]-2-(4-morpholinyl)-1-propanone (IRGACURE® 907), both available from Ciba Specialty Chemicals (Tarrytown, N.Y.).

Examples of acetophenone derivatives include, for example, hydroxyacetophenone compounds.

The composition may employ two or more photoinitiators. In embodiments, the composition comprises, a combination of two, three, or more photoinitiators. When a combination of photoinitiators is employed, the photoinitiators may be chosen from the same class of photoinitiator (e.g., all chosen from an acylphosphine type photoinitiator), or a combination of photoinitiators of two or more different classes.

The photoinitiator may be present in the composition in an amount of from about 0.0001 wt. % to about 5 wt. %; from about 0.001 wt. % to about 1 wt. %; even from about 0.01 wt. % to about 0.5 wt. %. Here as elsewhere in the specification and claims, numerical values may be combined to form new and non-disclosed ranges.

The composition also comprises a catalyst for promoting condensation curing of the composition. The catalyst can be selected from any of those compounds known to be useful for accelerating crosslinking in moisture-curable adhesive, sealant, and coating compositions. The catalyst can be a metal or non-metal compounds. Examples of metal condensation cure catalysts useful in the present invention include tin, titanium, zirconium, lead, iron, cobalt, antimony, manganese, bismuth, and zinc compounds. The tin compounds useful for facilitating crosslinking of the silylated polymers of the present invention include, but are not limited to, non-chelated tin compounds such as dibutyltin dilaurate, dibutyltin diacetate, dibutyltin dimethoxide, dimethyltin dineodecanoate, tin octoate and dibutyltinoxide. Diorgano-tin bis β-diketonates can be used. A particularly suitable diorganotin bis β-diketonate is dibutyltin bis-acetylacetonate. Other examples of useful tin compounds can be found in U.S. Pat. Nos. 5,213,899, 4,554,338, 4,956,436, and 5,489,479, the entire contents of which are incorporated by reference herein. Chelated titanium compounds, for example, 1,3-propanedioxytitanium bis(ethylacetoacetate), di-isopropoxytitanium bis(ethylacetoacetate), and tetra-alkyl titanates, for example tetra n-butyltitanate and tetra-isopropyltitanate, are also useful. In embodiments, the condensation catalyst of the present invention is a metal catalyst. The metal condensation catalyst is advantageously selected from the group consisting of tin compounds with dibutyltin dilaurate and "chelated" dibutyltin oxide, especially those sold under the Fomrez™ tradename from Momentive Performance Materials Inc. The tin-based catalysts are particularly suitable to provide a film that is substantially clear and transparent. Some non-tin catalysts may result in a more rapid yellowing of the cured film.

The condensation cure catalyst may be present in the composition in an amount of from about 5.0 wt. % to about 0.001 wt. %; from about 1 wt. % to about 0.001 wt. %; even from about 0.1 wt. % to about 0.01 wt. %. Here as elsewhere in the specification and claims, numerical values may be combined to form new and non-disclosed ranges.

The curable composition optionally comprises an adhesion promoter. The adhesion promoter is not particularly limited and can be any material now known or later discovered as a suitable adhesion promoter in condensation curing systems. Examples of suitable adhesion promoters may be found, for example, in WO 2014/20521, which is incorporated herein by reference in its entirety.

In embodiments, the adhesion promoters may be chosen from, but not limited to, an (aminoalkyl)trialkoxysilane, an (aminoalkyl)alkyldialkoxysilane, a bis(trialkoxysilylalkyl)amine, a tris(trialkoxy silylalkyl)amine, a tris(trialkoxysilylalkyl)cyanuarate, a tris(trialkoxysilylalkyl)isocyanurate, an (epoxyalkyl)trialkoxysilane, an (epoxyalkylether)trialkoxysilane, or a combination of two or more thereof. Examples of suitable adhesion promoters include, but are not limited to, N-(2-aminoethyl)aminopropyltrimethoxysilane, gamma-aminopropyltriethoxysilane, gamma-aminopropyltrimethoxysilane, bis(3-trimethoxysilypropyl)amine, N-phenyl-gamma-aminopropyltrimethoxysilane, triaminofunctionaltrimethoxysilane, gamma-aminopropylmethyldimethoxysilane, gamma-aminopropylmethyldiethoxysilane, methacryloxypropyltrimethoxysilane, methyl-aminopropyltrimethoxysilane, gamma-glycidoxypropylethyldimethoxysilane, gamma-glycidoxypropyltrimethoxysilane, gamma-glycidoxyethyltrimethoxysilane, gamma-glycidoxypropylmethyldimethoxysilane, gamma-glycidoxypropylmethyldiethoxysilane, beta-(3,4-epoxycyclohexyl)ethyltrimethoxysilane, beta-(3,4-epoxycyclohexyl)ethylmethyldimethoxysilane, beta-(3,4-epoxycyclohexyl)ethyltriethoxysilane, beta-(3,4-epoxycyclohexyl)ethylmethyldiethoxysilane, epoxylimonyltrimethoxysilane, isocyanatopropyltriethoxysilane, isocyanatopropyltrimethoxysilane, isocyanatopropylmethyldimethoxysilane, beta-cyanoethyltrimethoxysilane, gamma-acryloxypropyltrimethoxysilane, gamma-methacryloxypropylmethyldimethoxysilane, alpha, omega-bis(aminoalkyldiethoxysilyl)polydimethylsiloxanes (Pn=1-7), alpha, omega-bis(aminoalkyldiethoxysilyl)octamethyltetrasiloxane, 4-amino-3,3-dimethylbutyltrimethoxysilane, and N-ethyl-3-trimethoxysilyl-2-methylpropanamine, 3-(N,N-diethylaminopropyl) trimethoxysilane combinations of two or more thereof, and the like. Particularly suitable adhesion promoters include bis(alkyltrialkoxysilyl)amines and tris(alkyltrialkoxysilyl)amines including, but not limited to, bis(3-trimethoxysilylpropyl)amine and tris(3-trimethoxysilylpropyl)amine.

The adhesion promoter may be present in an amount of from about 0.1 to about 5.0 pt. wt. based on the weight of the composition. In one embodiment, the adhesion promoter may be present in an amount of from about 0.15 to about 2.0 pt. wt. based on the weight of the composition. In another embodiment, the adhesion promoter may be present in an amount of from about 0.5 to about 1.5 pt. wt. based on the weight of the composition.

U.V. stabilizers and/or antioxidants can be incorporated in the composition. Many such materials are known and can be used at conventional levels, e.g., from 0 to 10, and preferably from 0 to 4, weight parts per 100 weight parts of the total composition. Suitable materials of this type include, but are not limited to, those available from Ciba-Geigy under the trade names Tinuvin 770, Tinuvin 765, Tinuvin 327, Tinuvin 213, Tinuvin 622, and Irganox 1135.

The composition may optionally comprise a cure accelerating agent. The cure accelerating agent may be chosen from, for example, an organofunctional modified polysilicone resin. The organofunctional group may be chosen from, for example, an acrylic group, a (meth)acrylic group, a mercapto group, an epoxy group, or a combination of two more thereof.

The composition may also comprise an organofunctional modified polysilicone acryloxy resin. The organofunctional modified polysilicone acryloxy resin may be present in an amount of from about 0.01 to about 20 wt. % based on the total weight of the composition; from about 0.05 to about 15 wt. % based on the total weight of the composition; even from about 0.1 to about 10 wt. % based on the total weight of the composition. Here as elsewhere in the specification and claims, numerical values may be combined to form new and non-disclosed ranges.

The composition may comprise an antioxidant, which can be used for preventing oxidation of the cured product of the composition, and for improving weather resistance. Examples of suitable antioxidants include, but are not limited to, a hindered amine series or a hindered phenol antioxidant, etc. The hindered amine series antioxidant may be mentioned, for example, N,N',N'',N'''-tetrakis-(4,6-bis(butyl-(N-methy)-2,2,6,6-tetramethylpiperidin-4-yl)amino)-triazine-2-yl)-4,7-diazadecan-1,10-diamine, a polycondensation product of dibutylamine-1,3,5-triazine-N,N'-bis-(2,2,6,6-tetramethyl-4-piperidyl-1,6-hexamethylenediamine-N-(2,2,6,6-tetramethyl-4-piperidyl)butylamine, poly[{6-(1,1,3,3-tetramethylbutyl)amino-1,3,5-triazine-2,4-diyl}{(2,2,6,6-tetramethyl-4-piperidyl)imino}hexamethylene {(2,2,6,6-tetramethyl-4-piperidyl)imino}], a polymer of dimethyl succinate and 4-hydroxy-2,2,6,6-tetramethyl-1-piperidinethanol, [a reaction product of decanedioic acid bis(2,2,6,6-tetramethyl-1 (octyloxy)-4-piperidyl) ester, 1,1-dimethylethylhydroperoxide and octane] (70%)-polypropylene (30%), bis(1,2,2,6,6-pentamethyl-4-piperidyl)[[3,5-bis(1,1-dimethylethyl)-4-hydroxyphenyl]methyl]butylmalonate, methyl 1,2,2,6,6-pentamethyl-4-piperidylsebacate, bis(2,2,6,6-tetramethyl-4-piperidyl)sebacate, bis(1,2,2,6,6-pentamethyl-4-piperidyl)sebacate, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine, 4-benzoyloxy-2,2,6,6-tetramethylpiperidine, 8-acetyl-3-dodecyl-7,7,9,9-tetramethyl-1,3,8-triazaspiro[4.5]decan-2,4-dione, etc., but the present invention is not limited by these. The hindered phenol series antioxidant may be mentioned, for example, pentaerythritol-tetrakis[3-(3,5-di-tert-butyl-4-hydroxyphenyl)propionate], thiodiethylene-bis[3-(3,5-di-tert-butyl-4-hydroxyphenyl)propionate], octadecyl-3-(3,5-di-tert-butyl-4-hydroxyphenyl)propionate), N,N'-hexane-1,6-diylbis[3-(3,5-di-tert-butyl-4-hydroxyphenylpropioamide), benzenepropanoic acid 3,5-bis(1,1-dimethylethyl)-4-hydroxy C7-C9 side chain alkyl ester, 2,4-dimethyl-6-(1-methylpentadecyl)phenol, diethyl[[3,5-bis(1,1-dimethylethyl)-4-hydroxyphenyl]methyl]phosphonate, 3,3',3'',5,5',5''-hexane-tert-butyl-4-a,a',a''-(mesitylene-2,4,6-tolyl)tri-p-cresol, calcium diethylbis[[[3,5-bis-(1,1-dimethylethyl)-4-hydroxyphenyl]methyl]phosphonate], 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6-(1H,3H,5H)-trione, a reaction product of N-phenylbenzeneamine and 2,4,4-trimethylpentene, 2,6-di-tert-butyl-4-(4,6-bis(octylthio)-1,3,5-triazine-2-ylamino)phenol, etc., but the invention is not limited by these. The above-mentioned antioxidant may be used alone or in combination of two or more.

The composition may also include a photostabilizer, which can be used for preventing from deterioration by photo-oxidation of the cured product. Examples of suitable photostabilizers include, but are not limited to, a benzotriazole series, hindered amine series or benzoate series compound, etc. The UV absorber which is a light-resistant stabilizer can be used for improving weather resistance by preventing from light deterioration, and may be mentioned, for example, a UV absorber such as a benzotriazole series, triazine series, benzophenone series or benzoate series ones, etc. The UV absorber may be mentioned, for example, a benzotriazole series UV absorber such as 2,4-di-tert-butyl-6-(5-chlorobenzotriazol-2-yl)phenol, 2-(2H-benzotriazol-2-yl)-4,6-di-tert-pentylphenol, 2-(2H-benzotriazol-2-yl)-4-(1,1,3,3-tetramethylbutyl)phenol, a reaction product of methyl 3-(3-(21-1-benzotriazol-2-yl)-5-tert-butyl-4-hydroxyphenyl)propionate/polyethylene glycol 300, 2-(2H-benzotriazol-2-yl)-6-(straight and branched dodecyl)-4-methylphenol, etc., a triazine series UV absorber such as 2-(4,6-diphenyl-1,3,5-triazine-2-yl)-5-[(hexyl)oxy]-phenol, etc., a benzophenone series UV absorber such as octabenzone, etc., a benzoate series UV absorber such as 2,4-di-tert-butylphenyl-3,5-di-tert-butyl-4-hydroxybenzoate, etc., but the invention is not limited by these. The above-mentioned UV absorber may be used alone or in combination of two or more. The photostabilizer is preferably a hindered amine series one. Of these, it is preferred to use a tertiary amine-containing hindered amine series photostabilizer to improve storage stability of the composition. The tertiary amine-containing hindered amine series photostabilizer may be mentioned a photostabilizer such as Tinuvin 622LD, Tinuvin 144, CHIMASSORB 119FL (all mentioned above are available from BASF AG); MARK LA-57, LA-62, LA-67, LA-63 (all mentioned above are available from ASAHI DENKA KOGYO K.K. now ADEKA CORPORATION); SANDOL LS-765, LS-292, LS-2626, LS-1114, LS-744 (all mentioned above are available from SANKYO COMPANY. LTD. now DAIICHI SANKYO CO., LTD.), etc.

The curable compositions can be used to form a cured polymer material. The curable compositions are curable by both UV curing and moisture or condensation curing. The composition of the present invention can be cured by irradiating a UV ray. The lamp having a wavelength region which is in the range capable of causing a reaction of C may be mentioned, for example, a high-pressure mercury lamp (UV-7000) and a metal halide lamp (MHL-250, MHL-450, MHL-150, MHL-70) manufactured by USHIO INC., a metal halide lamp (JM-MTL 2KW) manufactured by South Korea: JM tech Co., a UV ray irradiating lamp (OSBL360) manufactured by Mitsubishi Electric Corporation, a UV ray irradiating machine (UD-20-2) manufactured by Japan Storage Battery Co., Ltd., a fluorescent lamp (FL-20BLB)) manufactured by Toshiba Corporation, and an H valve, H plus valve, D valve, Q valve, M valve. etc. manufactured by Fusion Co. etc. An irradiation dose may be 100 to 10000 mJ/cm$^2$, 300 to 5000 mJ/cm$^2$, 500 to 3500 mJ/cm$^2$, even 1000 to 1500 mJ/cm$^2$. Curing can be accomplished at any suitable temperature including ambient temperatures (e.g., about 20° C. to about 30° C.).

The composition of the present invention can have a visible light transmittance after curing with a cured thickness of 150 µm of 95% or more. The visible light transmittance may be 96% or more, even 98% or more.

The composition after curing may have a Haze value of about 1 or less; about 0.7 or less, about 0.5 or less; even about 0.4 or less. Haze may be evaluated with, for example, a BYK Gardner Haze Gard™ for 150-300 Lm thick cured film.

The composition after curing may have a yellow index (YI) of about 1 or less; about 0.7 or less; about 0.5 or less; even about 0.4 or less.

The composition may have a storage modulus in a semi solid state, of about 0.1 MPa or less; about 0.08 MPa or less; about 0.05 MPa or less; about 0.02 MPa or less; even about 0.01 MPa or less. In embodiments, upon curing, the cured material may have a storage modulus of from about 0.01 MPa to about 0.1 Pa; about 0.02 MPa to 0.08 MPa; about 0.03 MPa to about 0.06 MPa.

The material formed by curing may have penetration index from about 5 to 100; about 10 to about 80; even from about 20 to about 70. Penetration index may be measured, for example, by using a micro-penetrometer from Meitech as per ASTM 1403.

The composition of the present invention can be suitably and preferably used in an image display device, in particular, it is preferred as a resin to be interposed between a protective portion and an image display portion of a flat panel type image display device Specifically, the composition of the present invention is coated on a protective panel constituting a transparent protective portion formed by an optical plastic, etc., then, an image display panel constituting the image display portion is laminated thereto and an UV ray can be irradiated. A step may be provided at the peripheral portion of the protective panel to prevent from outflow of the composition of the present invention.

The composition of the present invention is generally provided in a liquid state and is excellent in coating properties without causing display failure caused by deformation of an image display portion and without lowering legibility, whereby a UV ray curable resin capable of realizing a display with high brightness and high contrast can be provided. The composition of the present invention is suitable for production of a large-sized image display device having an image display panel of 5 to 100 inches, more preferably 7 to 80 inches, further preferably 10 to 60 inches, or suitable for production of an ultra-thin type image display device having an image display device of preferably 10 to 500 µm, more preferably 20 to 450 µm, further preferably 50 to 400 µm.

FIG. 1 illustrates an embodiment of a display device comprising the present curable composition. The display device 10 comprises a display module 12, an adhesive layer 14 disposed over the display module, an ITO film touch sensor 16 overlying the adhesive layer 14, a black matrix 18 surrounding the perimeter of the film 16, and a screen glass 20 overlying the matrix 18 and film 16. A layer of optically clear adhesive 22 is disposed between the screen glass 20 and the film 16. The adhesive layer 14 is formed by a curable composition in accordance with the present technology. The black matrix is provided as a border and may be used for cosmetic purposes to hide components, e.g., wires, in the device. As such, regions of the adhesive layer 14 underlying the matrix will not be subjected to or receive radiation during UV curing. Thus, the present composition, which is both UV and moisture curable, allows for those regions under the matrix to sufficiently cure.

FIG. 1 illustrates an embodiment of a display device comprising the present curable composition. The display device 10 comprises a display module 12, an adhesive layer 14 disposed over the display module, an ITO film touch sensor 16 overlying the adhesive layer 14, a black matrix 18 surrounding the perimeter of the film 16, and a screen glass 20 overlying the matrix 18 and film 16. A layer of optically clear adhesive 22 is disposed between the screen glass 20 and the film 16. The adhesive layer 14 is formed by a curable composition in accordance with the present technology. The black matrix is provided as a border and may be used for cosmetic purposes to hide components, e.g., wires, in the device. As such, regions of the adhesive layer 14 underlying the matrix will not be subjected to or receive radiation during UV curing. Thus, the present composition, which is both UV and moisture curable, allows for those regions under the matrix to sufficiently cure.

Aspects and embodiments of the present technology may be further understood with reference to the following examples.

EXAMPLES

A series of examples are described below to illustrate the invention. However, the scope of the invention set forth in the claims should not be no way limited by the examples presented.

General Synthesis and Raw Materials

The (meth)acryloxypropyl-dimethoxy terminated polydimethylsiloxanes used in representative formulations are typically prepared via condensation reaction as described in U.S. Pat. No. 4,863,992 using silanes such as (meth)acryloxypropyl trimethoxy silane (available from Shin Etsu) and appropriate choice of mono or bis silanol terminated polydimethylsiloxanes (available from Momentive Performance Materials Inc.). mPDMS was prepared internally as described in U.S. Publication No. 2006/0229423 using anionic ring opening of hexamethylcyclotrisiloxane with alkyl lithium reagent in presence of appropriate (meth) acrylate functionalized capping agent. 3-[Tris(trimethylsiloxy)silyl]propyl methacrylate is available commercially from Sigma Aldrich. The (meth)acryloxypropyl-bis-terminated polydimethylsiloxanes were prepared by acid catalyzed ring opening reaction using 1,3-bis(3-methacryloxypropyl)-1,1,3,3-tetramethyldisiloxane (available from Momentive Performance Materials Inc.) and octamethylcyclotetrasiloxane (available from Momentive Performance Materials Inc.) as described in U.S. Pat. No. 8,524,850.

Example 1

A curable silicone composition was prepared by combining 39.0 parts by mass of methacryloxypropyl-bis-terminated polydimethylsiloxane (9000 cPs) (Polymer B), 39.0 parts by mass of acryloxypropyldimethoxy-mono-terminated polydimethylsiloxane (500 cPs) (Polymer C), 9.7 parts by mass of acryloxypropyl-dimethoxy-bis-terminated polydimethylsiloxane (1000 cPs) (Polymer A), 9.7 parts by mass of acryloxypropyl-dimethoxy-bis-terminated polydimethylsiloxane (7000 cPs) (Polymer A), 0.26 parts of the premixed photoinitiator combination (combination of Darocur1173:Lucirin TPO:Irgacure819 as 1:1.3:6.6), 0.97 part of glycidoxypropyl-trimethoxy silane (available from Sigma Aldrich), 0.97 part of methacryloxypropyl-trimethoxy silane (available from Tokyo Chemical Industry Co., Ltd.). The above composition was mixed thoroughly in a planetary speed mixer followed by degassing under reduced pressure. Subsequently, 0.07 parts by mass of dimethyltin-dineodacanoate (Formez UL 28) was added to the resulting mixture and mixed thoroughly in the speed mixer followed by degassing under reduced pressure. The resulting mixture was stored in dark airtight bottles under nitrogen at 10° C. for subsequent uses.

Example 2

A curable silicone composition was prepared by combining 39.0 parts by mass of methacryloxypropyl-bis-terminated polydimethylsiloxane (1500 cPs) (Polymer B), 9.7 parts by mass of 3-[Tris(trimethylsiloxy)silyl]propyl methacrylate (Polymer C), 9.7 parts by mass of acryloxypropyl-dimethoxy-bis-terminated polydimethylsiloxane (1000 cPs) (Polymer A), 9.7 parts by mass of acryloxypropyl-dimethoxy-bis-terminated polydimethylsiloxane (7000 cPs) (Polymer A), 0.27 parts of the premixed photoinitiator combination (combination of Darocur1173:Lucirin TPO:Irgacure819 as 1:1.3:6.6), 0.97 part of glycidoxypropyl-trimethoxy silane (available from Sigma Aldrich), 0.97 part of methacryloxypropyl-trimethoxy silane (available from Tokyo Chemical Industry Co., Ltd.). The above composition was mixed thoroughly in a planetary speed mixer followed by degassing under reduced pressure. Subsequently, 0.07 parts by mass of dimethyltin-dineodacanoate (Formez UL 28) was added to the resulting mixture and mixed thoroughly in the speed mixer followed by degassing under reduced pressure. The resulting mixture was stored in dark airtight bottles under nitrogen at 10° C. for subsequent uses.

Example 3

A curable silicone composition was prepared by combining 39.4 parts by mass of methacryloxypropyl-bis-terminated polydimethylsiloxane (1500 cPs) (Polymer B), 9.8 parts by mass of acryloxypropyl-mono-terminated polydimethylsiloxane (3-5 cPs) (Polymer C), 9.8 parts by mass of acryloxypropyl-dimethoxy-bis-terminated polydimethylsiloxane (1000 cPs) (Polymer A), 39.4 parts by mass of acryloxypropyl-dimethoxy-bis-terminated polydimethylsiloxane (7000 cPs) (Polymer A), 0.26 parts of the premixed photoinitiator combination (combination of Darocur1173:Lucirin TPO:Irgacure819 as 1:1.3:6.6), 0.97 part of glycidoxypropyl-trimethoxy silane (available from Sigma Aldrich). The above composition was mixed thoroughly in a planetary speed mixer followed by degassing under reduced pressure. Subsequently, 0.08 parts by mass of dimethyltin-dineodacanoate (Formez UL 28) was added to the resulting mixture and mixed thoroughly in the speed mixer followed by degassing under reduced pressure. The resulting mixture was stored in dark airtight bottles under nitrogen at 10° C. for subsequent uses.

Comparative Example 1

A curable silicone composition was prepared by combining 43.3 parts by mass of methacryloxypropyl-bis-terminated polydimethylsiloxane (9000 cPs) (Polymer B), 10.8 parts by mass of acryloxypropyl-dimethoxy-bis-terminated polydimethylsiloxane (1000 cPs) (Polymer A), 43.3 parts by mass of acryloxypropyl-dimethoxy-bis-terminated polydimethylsiloxane (7000 cPs) (Polymer A), 0.29 parts of the premixed photoinitiator combination (combination of Darocur1173:Lucirin TPO:Irgacure819 as 1:1.3:6.6), 1.0 part of glycidoxypropyl-trimethoxy silane (available from Sigma Aldrich), 1.0 part of methacryloxypropyl-trimethoxy silane (available from Tokyo Chemical Industry Co., Ltd.). The above composition was mixed thoroughly in a planetary speed mixer followed by degassing under reduced pressure.

Subsequently, 0.07 parts by mass of dimethyltin-dineodacanoate (Formez UL 28) was added to the resulting mixture and mixed thoroughly in the speed mixer followed by degassing under reduced pressure. The resulting mixture was stored in dark airtight bottles under nitrogen at 10° C. for subsequent uses.

Cure Performance

The curable compositions as described above were poured on top of a glass plate (2 mm thick). The dimension of the adhesive layer with 17 mm (width), 19 mm (length), and 150 m (thickness) were controlled by using Teflon sheets as spacers. Two edges were left open for moisture access. The top glass was placed on top of the adhesive layer. A light access window made from black insulation tape (opaque on the edges) with dimensions 17 mm (width) and 11 mm (length) was placed on top. The compositions (Examples 1-3 and Comparative Example 1) placed in between the glass plates were subjected to UV radiation (metal halide, 3000 mJ/cm$^2$) from top and subsequent exposure to humidity (25° C./50% RH). Post curing the modulus and adhesive nature were examined via lap-sheer test method (ASTM 3163) using an Instron. The cured adhesive layers obtained from the examples were colorless and transparent. Furthermore, they also exhibited resistance to coloration and haze development on exposure to heat, light and humidity. Additionally, the composition in accordance with aspects and embodiments of the invention exhibit a relatively low modulus after both UV and condensation curing as compared to Comparative Example 1.

| Properties | Example 1 | Example 2 | Example 3 | Comparative Example 1 |
|---|---|---|---|---|
| Appearance (uncured) | Pale yellow, transparent | Pale yellow, transparent | Pale yellow, transparent | Pale yellow, transparent |
| Appearance (cured) | Colorless, transparent | Colorless, transparent | Colorless, transparent | Colorless, transparent |
| Young's Modulus (after UV) (MPa) | 0.05 | 0.04 | 0.04 | 0.107 |
| Young's Modulus (after UV + Moisture) (MPa) | 0.06 | 0.05 | 0.05 | 0.149 |
| Nature of Adhesion | Cohesive | Cohesive | Cohesive | Adhesive |
| Transmittance (% T) | >98% | >98% | >98% | >98% |

While the above description contains many specifics, these specifics should not be construed as limitations on the scope of the invention, but merely as exemplifications of preferred embodiments thereof. Those skilled in the art will envision many other possible variations that are within the scope and spirit of the invention as defined by the claims appended hereto.

What is claimed is:

1. A radiation curable and moisture curable composition comprising:

(A) a first acrylic functional polyorganosiloxane with at least one moisture curable functional group;

(B) a second acrylic functional polyorganosiloxane, which may optionally contain a moisture curable functional group; and (C) a third functional polyorganosiloxane of the formula:

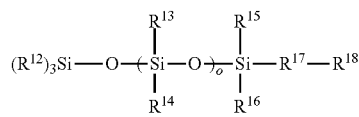

where $R^{13}$, $R^{14}$ are independently chosen from a C1-C10 alkyl; an unsaturated C1-C10 alkyl; a C1-C10 alkyl comprising one or more halogen groups; a C6-C30 aryl; and a C6-C30 substituted aryl;

$R^{12}$ is chosen from a C1-C10 alkyl; a C1-C10 alkyl comprising one or more halogen groups; a C6-C30 aryl; or a C6-C30 substituted aryl;

$R^{15}$ and $R^{16}$ are independently chosen from a C1-C3 alkyl, a alkoxyalkyl, and a siloxyalkyl;

$R^{17}$ is independently chosen from null (i.e., a bond), a C1-C10 alkyl; and a C6-C30 cycloalkyl group where the C1-C10 alkyl or C6-C30 cycloalkyl group may comprise a hydroxy group, an alkoxy group, and may have one or more heteroatoms;

$R^{18}$ is chosen from a C2-C10 unsaturated alkyl, or a (meth)acryl group, with the proviso that when $R^{18}$ is an unsaturated alkyl group, $R^{15}$, $R^{16}$, or both $R^{15}$ and $R^{16}$ are chosen from an alkoxyalkyl and a siloxyalkyl; and o is zero or positive numbers.

2. The composition of claim 1, wherein:

the first acrylic functional polyorganosiloxane (A) is of the formula:

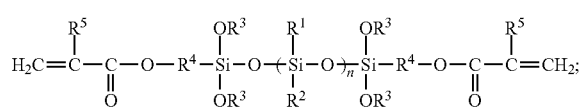

and the second acrylic functional polyorganosiloxane (B) is of the formula:

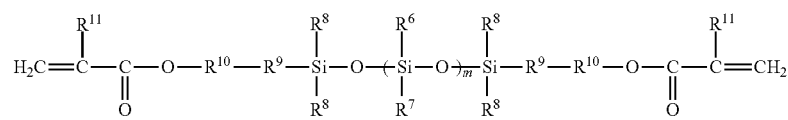

where $R^1$, $R^2$, $R^3$, $R^6$, $R^7$, $R^8$ are independently chosen from a C1-C10 alkyl; an unsaturated C1-C10 alkyl; a C1-C10 alkyl comprising one or more halogen groups; a C6-C30 aryl; and a C6-C30 substituted aryl;

$R^4$ and $R^9$ are independently chosen from a C1-C10 alkylene with or without substitution or interruption by one or more heteroatoms;

$R^{10}$ is independently chosen from null (i.e., a bond); a C1-C10 alkyl; or a C6-C30 cycloalkyl group, the C1-C10 alkyl or C6-C30 alkyl group optionally comprising an —OR$^{19}$ substituent where R$^{19}$ is hydrogen or a C1-C6 alkyl;

R$^5$ and R$^{11}$ are independently chosen from hydrogen or a C1-C6 alkyl; and n and m are independent of each other and are zero or positive numbers.

3. The composition of claim 2 comprising the third functional polyorganosiloxane (C) in an amount of at least 0.01 wt. % based on the total weight of the composition.

4. The composition of claim 2 comprising the third functional polyorganosiloxane (C) in an amount of from about 0.01 wt. % to about 50 wt. % based on the total weight of the composition.

5. The composition of claim 2 wherein the ratio of the first acrylic polyorganosiloxane (A) to the second acrylic functional polyorganosiloxane (B) is from about 99.95:0.05 to about 0.05:99.95.

6. The composition of claim 2, wherein the first acrylic functional polyorganosiloxane (A) has a viscosity of from about 500 cps to about 15,000 cps; the second acrylic functional polyorganosiloxane (B) has a viscosity of from about 500 cps to about 15,000 cps; and the third acrylic functional polyorganosiloxane has a viscosity of from about 3 cps to about 1,000 cps.

7. The composition of claim 2 comprising two or more first acrylic functional polyorganosiloxanes (A).

8. The composition of claim 7, wherein the two or more first acrylic functional polyorganosiloxanes (A) each having a different viscosity.

9. The composition of claim 1 comprising a photoinitiator component and a moisture cure catalyst.

10. The composition of claim 9, wherein the photoinitiator is chosen from a benzophenone, a phosphine oxide, a nitroso compound, an acryl halide, a hydrazone, a hydroxy ketone, an amino ketone, a mercapto compound, a pyrillium compound, a triacrylimidazole, a benzimidazole, a chloroalkyl triazine, a benzoin ether, a benzil ketal, a benzil ester, a thioxanthone, a camphorquinone, an acetophenone derivative, or a combination of two or more thereof.

11. The composition of claim 10 wherein the photoinitiator comprises a mixture of a hydroxyketone and a phosphine oxide.

12. The composition of claim 1 comprising an adhesion promoter.

13. The composition of claim 12, wherein the adhesion promoter is chosen from an (aminoalkyl)trialkoxysilane, an (aminoalkyl)alkyldialkoxysilane, a bis(trialkoxysilylalkyl)amine, a tris(trialkoxysilylalkyl)amine, a tris(trialkoxysilylalkyl)cyanuarate, a tris(trialkoxysilylalkyl)isocyanurate, an (epoxyalkyl)trialkoxysilane, an (epoxyalkylether)trialkoxysilane, or a combination of two or more thereof.

14. The composition of claim 1 further comprising an acryloxy resin.

15. A cured film formed from the composition of claim 1.

16. An article comprising the cured film of claim 15.

17. A sealing agent for an image display device comprising the composition of claim 1.

18. An image display device comprising an image display portion and a protective portion encapsulated by the sealing agent of claim 17.

19. A method of forming a cured film comprising curing the composition of claim 1 by (a) UV radiation, and/or (b) condensation curing.

* * * * *